(12) United States Patent
Kawabe et al.

(10) Patent No.: US 9,902,240 B2
(45) Date of Patent: Feb. 27, 2018

(54) VEHICLE DOOR FRAME STRUCTURE

(71) Applicant: Toyota Jidosha Kabushiki Kaisha, Toyota-shi, Aichi-ken (JP)

(72) Inventors: Hirokazu Kawabe, Nagoya (JP); Minoru Yoshida, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/016,777

(22) Filed: Feb. 5, 2016

(65) Prior Publication Data

US 2016/0229269 A1   Aug. 11, 2016

(30) Foreign Application Priority Data

Feb. 6, 2015   (JP) .................................. 2015-022506

(51) Int. Cl.
*B60J 5/04* (2006.01)

(52) U.S. Cl.
CPC ............. *B60J 5/0402* (2013.01); *B60J 5/042* (2013.01)

(58) Field of Classification Search
CPC .......... B60J 5/0401; B60J 5/0406; B60J 5/04; B60J 5/0422
USPC .......................................................... 49/502
See application file for complete search history.

(56) References Cited

U.S. PATENT DOCUMENTS

| | | | | |
|---|---|---|---|---|
| 4,328,642 A | * | 5/1982 | Presto .................... | B60J 5/0406 49/502 |
| 4,512,240 A | * | 4/1985 | Mahler .................. | B60J 5/0405 454/124 |
| 5,107,624 A | * | 4/1992 | Passone ................. | B60J 5/0402 296/146.9 |
| 6,039,384 A | * | 3/2000 | Schulte .................. | B60J 5/0402 296/146.2 |
| 6,513,860 B1 | * | 2/2003 | Ourchane ............. | B23K 31/02 296/146.5 |
| 7,097,742 B2 | * | 8/2006 | Furuse ................... | B60J 5/0405 296/146.6 |

(Continued)

FOREIGN PATENT DOCUMENTS

| | | |
|---|---|---|
| JP | S63-112132 U | 7/1988 |
| JP | H07-257182 A | 10/1995 |
| JP | 03-010929 A | 2/2000 |
| JP | 2001-080361 A | 3/2001 |
| JP | 2004-352083 A | 12/2004 |
| JP | 2012-176712 A | 9/2012 |
| JP | 5561445 B2 | 7/2014 |

*Primary Examiner* — Katherine W Mitchell
*Assistant Examiner* — Catherine A Kelly
(74) *Attorney, Agent, or Firm* — Dinsmore & Shohl LLP (57) ABSTRACT

An outer frame reinforcement is disposed on the door outer side of an inner panel-side sash portion of a door inner panel. The outer frame reinforcement includes a frame-side sash portion, a hinge reinforcement portion, and a lock reinforcement portion. Here, the upper end of the hinge reinforcement portion is joined to the front side lower end of the frame-side sash portion, and the upper end of the lock reinforcement portion is joined to the rear side lower end of the frame-side sash portion. Furthermore, the hinge reinforcement portion and the lock reinforcement portion are set thicker than the frame-side sash portion. Because of this, the outer frame reinforcement can be formed by making the reinforcement portions thick and joining the reinforcement portions to the frame-side sash portion. Because of this, it becomes unnecessary to increase the plate thickness of the entire outer frame reinforcement.

4 Claims, 5 Drawing Sheets

(56) References Cited

U.S. PATENT DOCUMENTS

| | | | | |
|---|---|---|---|---|
| 7,363,750 | B2* | 4/2008 | Seksaria | B60J 5/0416 49/349 |
| 8,091,286 | B2* | 1/2012 | Totani | B60J 5/0401 296/146.5 |
| 8,651,557 | B2* | 2/2014 | Suzuki | B60J 5/0401 296/146.2 |
| 9,346,339 | B2* | 5/2016 | Shimizu | B60J 5/0402 |
| 2003/0177702 | A1* | 9/2003 | Hock | B60J 5/0402 49/502 |
| 2005/0066584 | A1* | 3/2005 | Mounie | B60J 5/0402 49/502 |
| 2015/0097350 | A1 | 4/2015 | Shirakami et al. | |

* cited by examiner

VEHICLE DOOR FRAME STRUCTURE

CROSS-REFERENCE TO RELATED APPLICATION

This application is based on and claims priority under 35 USC 119 from Japanese Patent Application No. 2015-022506 filed on Feb. 6, 2015, the disclosure of which is incorporated by reference herein.

BACKGROUND

Technical Field

The present specification relates to a vehicle door frame structure.

Related Art

Patent Document 1 (Japanese Utility Model Application Laid-open (JP-U) No. S63-112132) discloses an automobile door sash structure in which a sash is configured by an outer sash and an inner sash. Furthermore, a latch reinforcement is integrally formed on the rear side lower end portion of the inner sash. For this reason, the number of parts of the inner sash can be reduced. Examples of other related documents include Japanese Patent Application Laid-open (JP-A) No. H03-010929 (patent document 2), JP-A No. 2001-080361 (patent document 3), and Japanese Patent No. 5,561,445 (patent document 4).

In this connection, in a frame member (frame reinforcement) such as an inner sash that configures a sash, in order to raise the strength of a reinforcement portion such as the latch reinforcement, there are cases where the plate thickness of the reinforcement portion is increased. In this case, when the plate thickness of the entire frame member (frame reinforcement) is increased to match the strength of the reinforcement portion, there is the problem that the weight of the entire frame member (frame reinforcement) becomes heavier and therefore the weight of the entire vehicle door becomes heavier.

SUMMARY

In consideration of the circumstances described above, it is an object of the present specification to provide a vehicle door frame structure in which reinforcement portions can be disposed in a frame reinforcement while controlling an increase in the weight of the vehicle door.

A vehicle door frame structure pertaining to a first aspect of the present specification includes: a door inner panel that forms a door inner side section of a vehicle door and has a door body portion and an inner panel-side sash portion that is integrally formed on the door upper side of the door body portion and forms a window frame; and a frame reinforcement that is disposed on the door outer side of the inner panel-side sash portion and is joined to the door inner panel, wherein the frame reinforcement includes a frame-side sash portion that is formed along the inner panel-side sash portion, a hinge reinforcement portion whose upper end is joined to a front side lower end of the frame-side sash portion and to which a hinge is attached, and a lock reinforcement portion whose upper end is joined to a rear side lower end of the frame-side sash portion and to which a door lock device is attached, and the thicknesses of the hinge reinforcement portion and the lock reinforcement portion are set thicker than the thickness of the frame-side sash portion.

In the vehicle door frame structure pertaining to the first aspect, the door inner panel that forms the door inner side section of the vehicle door has the door body portion and the inner panel-side sash portion that is integrally formed with the door body portion. Additionally, the inner panel-side sash portion is placed on the door upper side of the door body portion and forms a window frame.

The frame reinforcement is disposed on the door outer side of the inner panel-side sash portion, and the frame reinforcement is joined to the door inner panel. Because of this, the inner panel-side sash portion is reinforced by the frame reinforcement. Furthermore, the frame reinforcement includes the frame-side sash portion that is formed along the inner panel-side sash portion, the hinge reinforcement portion to which the hinge is attached, and the lock reinforcement portion to which the door lock device is attached. Because of this, reinforcement portions (the hinge reinforcement portion and the lock reinforcement portion) can be disposed in the frame reinforcement, and these reinforcement portions can be effectively utilized to attach the hinge and the door lock device.

Here, the upper end of the hinge reinforcement portion is joined to the front side lower end of the frame-side sash portion, and the upper end of the lock reinforcement portion is joined to the rear side lower end of the frame-side sash portion. Furthermore, the thicknesses of the hinge reinforcement portion and the lock reinforcement portion are set thicker than the thickness of the frame-side sash portion. Because of this, even in the case of increasing the plate thicknesses of the reinforcement portions in order to raise the strength of the reinforcement portions (the hinge reinforcement portion and the lock reinforcement portion), the frame reinforcement can be formed by setting thick just the plate thicknesses of the reinforcement portions and joining to the frame-side sash portion the reinforcement portions that have been set thick. Because of this, it becomes unnecessary to increase the plate thickness of the entire frame reinforcement, so the reinforcement portions can be disposed in the frame reinforcement while controlling an increase in the weight of the vehicle door.

A vehicle door frame structure pertaining to a second aspect is the first aspect, wherein the joint portion between the frame-side sash portion and the hinge reinforcement portion is placed on the door upper side of the joint portion between the frame-side sash portion and the lock reinforcement portion.

In the vehicle door frame structure pertaining to the second aspect, the joint portion (called a "front side joint portion" below for the sake of convenience) between the frame-side sash portion and the hinge reinforcement portion is placed on the door upper side of the joint portion (called a "rear side joint portion" below for the sake of convenience) between the frame-side sash portion and the lock reinforcement portion. Additionally, in the vehicle door frame structure, it was ascertained that the hinge reinforcement portion has a higher contribution rate with respect to the rigidity of the frame reinforcement than the lock reinforcement portion. For this reason, by placing the front side joint portion on the door upper side of the rear side joint portion, the rigidity of the frame reinforcement can be efficiently raised while controlling an increase in the weight of the frame reinforcement.

A vehicle door frame structure pertaining to a third aspect is the first or second aspect, wherein door inner side surfaces of the joint portion between the frame-side sash portion and the hinge reinforcement portion and the joint portion between the frame-side sash portion and the lock reinforcement portion are evenly formed.

In the vehicle door frame structure pertaining to the third aspect, the door inner side surfaces of the joint portion between the frame-side sash portion and the hinge reinforcement portion and the joint portion between the frame-side sash portion and the lock reinforcement portion are evenly formed, so the evenly formed door inner side surfaces of the joint portions of the frame reinforcement can be joined to the door inner panel (the inner panel-side sash portion). Because of this, the frame reinforcement and the door inner panel (the inner panelside sash portion) can be well joined to each other.

According to the vehicle door frame structure pertaining to the first aspect, the reinforcement portions can be disposed in the frame reinforcement while controlling an increase in the weight of the vehicle door.

According to the vehicle door frame structure pertaining to the second aspect, the rigidity of the outer frame can be efficiently raised while controlling an increase in the weight of the frame reinforcement.

According to the vehicle door frame structure pertaining to the third aspect, the frame reinforcement and the door inner panel (the inner panel-side sash portion) can be well joined to each other.

DETAILED DESCRIPTION OF THE EMBODIMENTS

Figure 2:
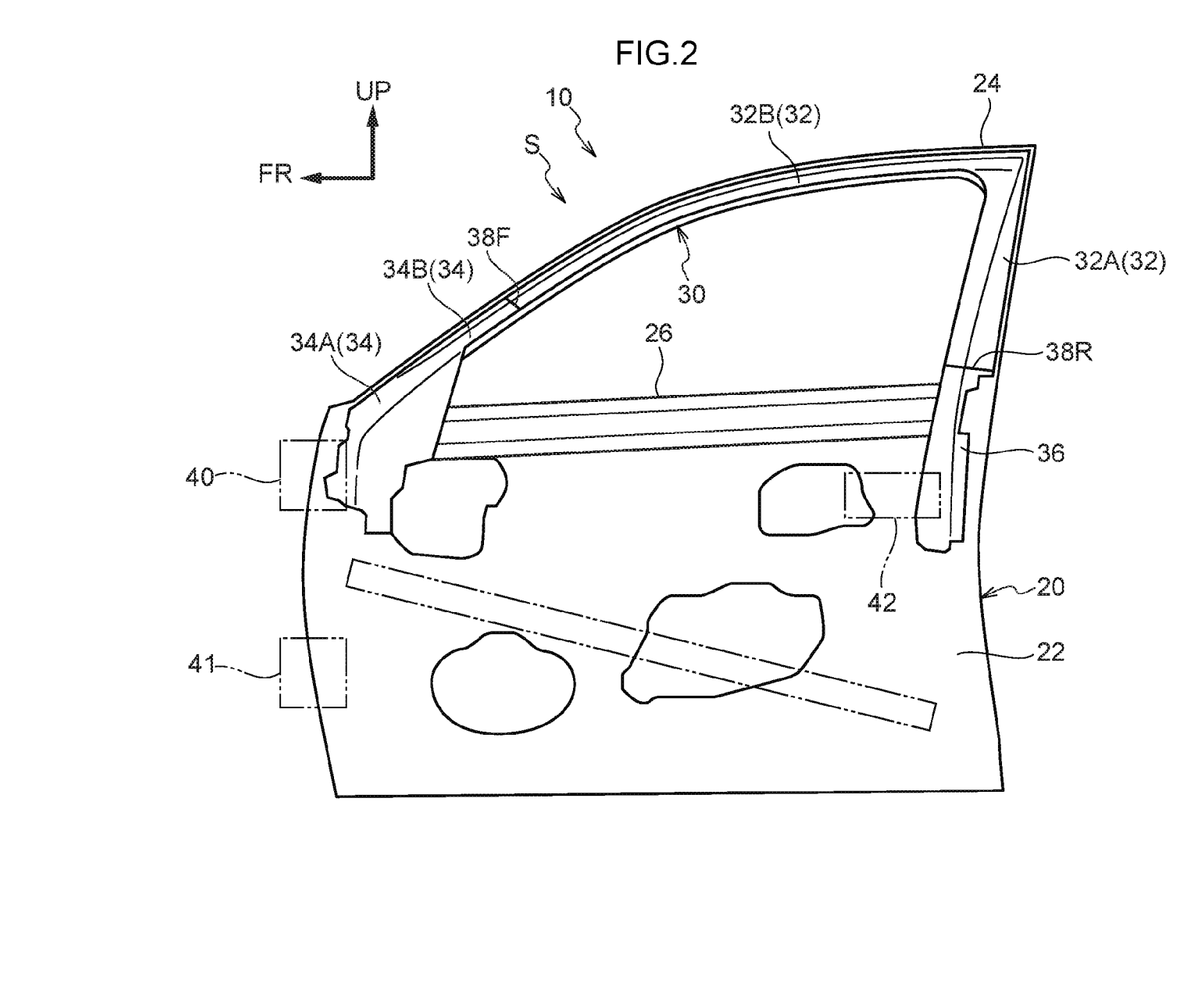
FIG. 2 is a side view, seen from the door outer side, showing relevant portions of the side door to which the vehicle door frame structure pertaining to the embodiment has been applied.
Figure 3:
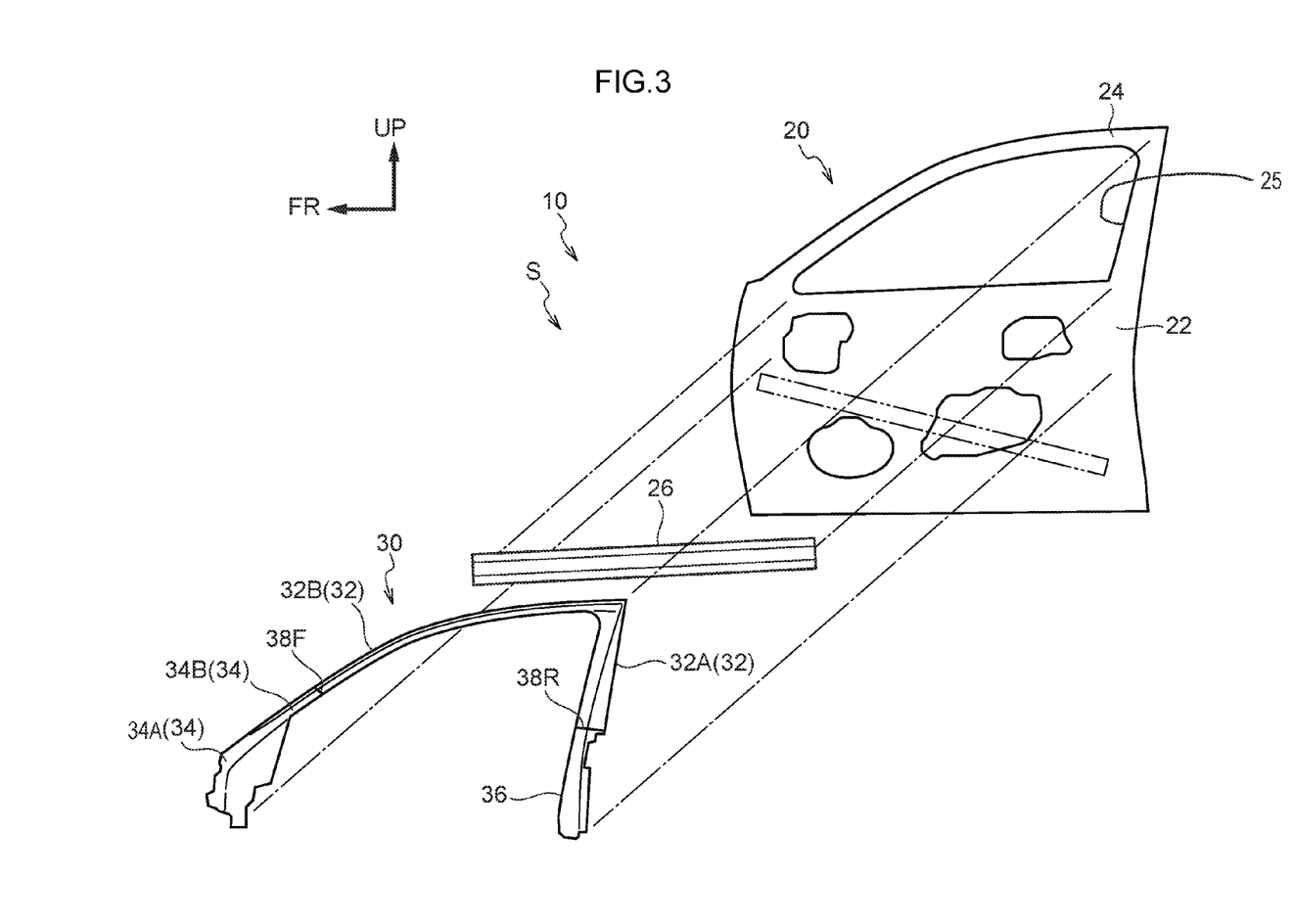
FIG. 3 is a side view, seen from the door outer side, showing a state in which the relevant portions of the side door shown in FIG. 2 have been exploded.

A side door 10 serving as a "vehicle door" to which a vehicle door frame structure S pertaining to an embodiment of the present specification has been applied will be described below using the drawings. In FIG. 2, relevant portions of the side door 10, which is disposed on a right side portion of a vehicle (automobile), are shown in a simple side view seen from the door outer side. In FIG. 3, a state in which the relevant portions of the side door 10 have been exploded is shown in a simple side seen from the door outer side. It should be noted that arrow FR appropriately shown in the drawings indicates the door front side of the side door 10 and arrow UP indicates the door upper side.

As shown in FIG. 2, the side door 10 is mounted at the front end portion thereof to a vehicle body by a later-described hinge 40 in such a way that the side door 10 can be opened and closed about an axial direction coinciding with the door up and down direction. Additionally, in a state in which the side door 10 is mounted to the vehicle body and is closing a door opening in the vehicle, the thickness direction of the side door 10 coincides with the vehicle width direction of the vehicle, the door outer side coincides with the vehicle width direction outer side of the vehicle, and the door inner side coincides with the vehicle width direction inner side of the vehicle. Furthermore, in this state, the door up and down direction coincides with the vehicle up and down direction, and the door front and rear direction coincides with the vehicle front and rear direction. Additionally, as shown also in FIG. 3, the side door 10 includes a door inner panel 20, which forms the door inner side section of the side door 10, and an outer frame reinforcement 30, which serves as a "frame reinforcement" that reinforces an inner panel-side sash portion 24 of the door inner panel 20. The configuration of each will be described below.

The door inner panel 20 is formed of metal such as a steel plate and is placed in such a way that its plate thickness direction coincides with the substantially door thickness direction. Furthermore, the door inner panel 20 includes a door body portion 22, which is formed in a substantially rectangular plate shape, and an inner panel-side sash portion 24, which is placed on the door upper side of the door body portion 22 and forms a window frame 25. The door body portion 22 and the inner panel-side sash portion 24 are integrally molded by stamping, for example. Furthermore, the inner panel-side sash portion 24 is formed in a substantially inverted V-shape that opens to the door lower side as seen from the door thickness direction. Specifically, the inner panel-side sash portion 24 extends toward the door upper side from the rear end portion of the upper portion of the door body portion 22 and is bent toward the door front side at its lengthwise direction middle portion. Furthermore, the door front side section of the inner panel-side side sash portion 24 is sloped toward the door lower side heading toward the door front side as seen in a side view, and the front end portion of the inner panel-side sash portion 24 is coupled to the front end portion of the upper portion of the door body portion 22.

A beltline inner reinforcement 26 is disposed on the door outer side of the upper end portion of the door inner panel 20. The beltline inner reinforcement 26 is formed of metal such as a steel plate and extends in the door front and rear direction in such a way that its plate thickness direction coincides with the door thickness direction of the side door 10. Additionally, the beltline inner reinforcement 26 is joined to the upper end portion of the door inner panel 20. Because of this, the upper end portion of the door inner panel 20 is reinforced by the beltline inner reinforcement 26.

Moreover, a door outer panel (not shown in the drawings) that configures a design surface of the side door 10 is disposed on the door outer side of the door inner panel 20. The door outer panel is formed of metal such as a steel plate and is formed in a substantially rectangular plate shape corresponding to the shape of the door body portion 22 of the door inner panel 20. Additionally, the outer peripheral edge portion excluding the upper end portion of the door inner panel 20 is bonded by hemming to the outer peripheral edge portion excluding the upper end portion of the door outer panel. A door trim not shown in the drawings is mounted to the door inner side of the door inner panel 20.

The outer frame reinforcement 30 is disposed on the door outer side of the inner panel-side sash portion 24 and is formed along the inner panel-side sash portion 24. Specifically, as shown also in FIG. 1, the outer frame reinforcement 30 includes a frame-side sash portion 32 that forms the lengthwise direction middle portion of the outer frame reinforcement 30, a hinge reinforcement portion 34 that extends toward the door front side and the door lower side from the front side lower end of the frame-side sash portion 32, and a lock reinforcement portion 36 that extends toward the door lower side from the rear side lower end of the frame-side sash portion 32. Additionally, the frame-side sash portion 32, the hinge reinforcement portion 34, and the lock reinforcement portion 36 are each formed of by metal such as a steel plate, are placed in such a way that their plate thickness direction coincides with the door thickness direction, and are joined to each other and integrated.

Figure 1:
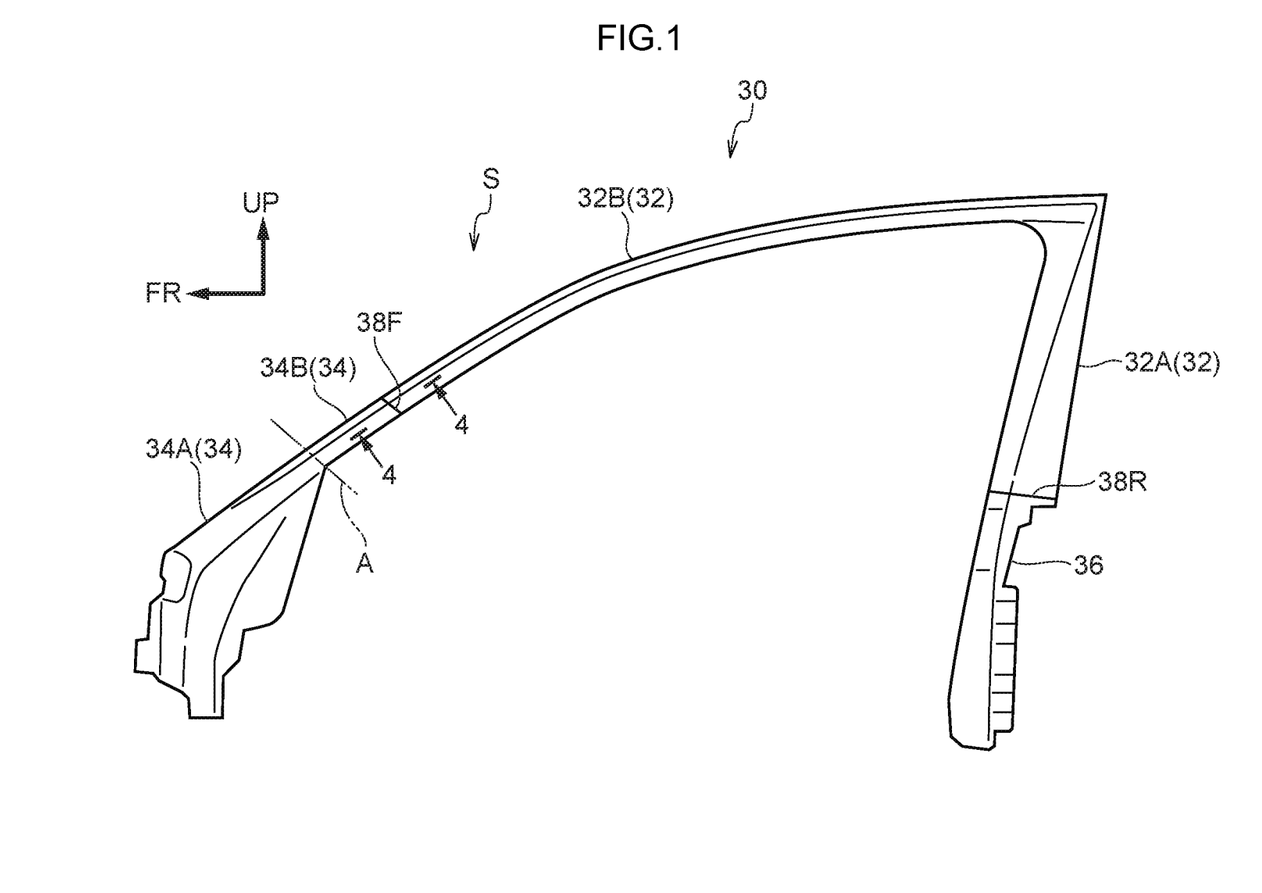
FIG. 1 is a side view, seen from a door outer side, simply showing an outer frame reinforcement used in a side door to which a vehicle door frame structure pertaining to an embodiment of the present specification has been applied.

The frame-side sash portion 32 is formed along the inner panel-side sash portion 24 and has a substantially inverted V-shape that opens toward the door lower side as seen in a side view. Specifically, the frame-side sash portion 32 has a vertical pillar portion 32A that forms the rear end portion of the frame-side sash portion 32, and the vertical pillar portion 32A extends along the substantially door up and down direction. Furthermore, the frame-side sash portion 32 has a frame portion 32B. The frame portion 32B extends toward the door front side from the upper end of the vertical pillar portion 32A, and the door front side section of the frame portion 32B is sloped toward the door lower side heading toward the door front side as seen in a side view.

The hinge reinforcement portion 34 includes a body portion 34A, which is formed in a substantially rhombus shape as seen in a side view, and an extension portion 34B, which extends toward the door upper side and obliquely rearward from the body portion 34A. Furthermore, the plate thickness dimension of the hinge reinforcement portion 34 is set larger than the plate thickness dimension of the frame-side sash portion 32 (in the present embodiment, the plate thickness dimension of the hinge reinforcement portion 34 is set to 2.5 mm and the plate thickness dimension of the frame-side sash portion 32 is set to 1.4 mm). Furthermore, the width dimension of the extension portion 34B and the width dimension of the frame portion 32B are set in such a way as to substantially coincide with each other.

Figure 4:
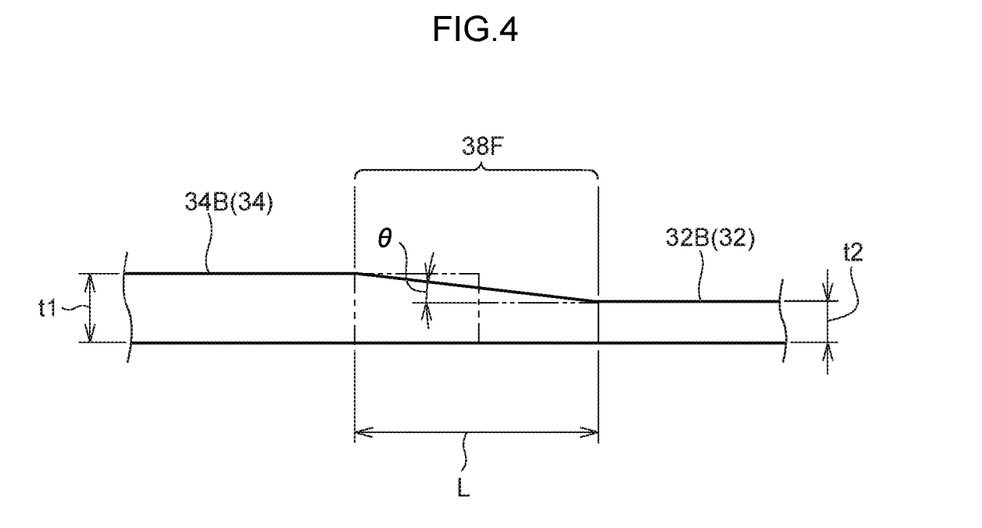
FIG. 4 is an enlarged sectional view (a sectional view along line 4-4 of FIG. 1) showing a joint portion between a frame-side sash portion and a hinge reinforcement portion shown in FIG. 1.

Additionally, the frame-side sash portion 32 and the hinge reinforcement portion 34 are pressure differential bonded to each other in a state in which the upper end of the extension portion 34B and the front side lower end of the frame portion 32B have been brought into face to face contact with each other. Specifically, as shown in FIG. 4, the frameside sash portion 32 and the hinge reinforcement portion 34 are placed in such a way that their door inner side surfaces are even, and the frame-side sash portion 32 and the hinge reinforcement portion 34 are joined to each other by friction stir welding. Furthermore, the door outer side surface of the joint portion (hereinafter this joint portion will be called a "front side joint portion 38F") between the frame-side sash portion 32 and the hinge reinforcement portion 34 is a sloping surface that is sloped substantially linearly toward the door outer side heading from the frame-side sash portion 32 toward the hinge reinforcement portion 34. Additionally, an angle of inclination θ of the door outer side surface of the front side joint portion 38F with respect to the door outer side surface of the frame portion 32B is set larger than 0° and smaller than 30°. It should be noted that for the sake of convenience hatching is omitted from FIG. 4.

Furthermore, as shown in FIG. 2, the body portion 34A of the hinge reinforcement portion 34 is joined to the door inner panel 20, and the substantially lower half section of the body portion 34A is placed between the door inner panel 20 and the door outer panel. Additionally, an upper side hinge retainer (not shown in the drawings) formed of metal such as a steel plate is joined to the body portion 34A of the hinge reinforcement portion 34, and the hinge 40 secured to the vehicle body is fastened and secured to the upper side hinge retainer via the door inner panel 20 and the body portion 34A of the hinge reinforcement portion 34. Because of this, the side door 10 is rotatably supported on the vehicle body. It should be noted that on the door lower side of the hinge reinforcement portion 34 a lower side hinge retainer (not shown in the drawings) is joined to the door inner panel 20, and a hinge 41 (see FIG. 2) is fastened and secured to the lower side hinge retainer.

As shown also in FIG. 1, the lock reinforcement portion 36 is formed in a substantially rectangular plate shape whose lengthwise direction coincides with the door up and down direction. Furthermore, the plate thickness dimension of the lock reinforcement portion 36 is set larger than the plate thickness dimension of the frame-side sash portion 32 (in the present embodiment, the plate thickness dimension of the lock reinforcement portion 36 is set to 2 mm). Moreover, the width dimension of the lock reinforcement portion 36 and the width dimension of the vertical pillar portion 32A of the frame-side sash portion 32 are set in such a way as to substantially coincide with each other. Additionally, the frame-side sash portion 32 and the lock reinforcement portion 36 are pressure differential bonded to each other in a state in which the upper end of the lock reinforcement portion 36 and the lower end of the vertical pillar portion 32A have been brought into face to face contact with each other. Specifically, the joint portion (hereinafter this joint portion will be called a "rear side joint portion 38W") between the frame-side sash portion 32 and the lock reinforcement portion 36 is formed in the same way as the front side joint portion 38F. That is, the frame-side sash portion 32 and the lock reinforcement portion 36 are placed in such a way that their door inner side surfaces are even, and the frame-side sash portion 32 and the lock reinforcement portion 36 are joined to each other by friction stir welding. Furthermore, the door outer side surface of the rear side joint portion 38R is a sloped surface that is sloped substantially linearly toward the door outer side heading from the frame-side sash portion 32 toward the lock reinforcement portion 36.

Furthermore, as shown in FIG. 2, the lock reinforcement portion 36 is joined to the door inner panel 20, and most of the lock reinforcement portion 36 is placed between the door inner panel 20 and the door outer panel. Additionally, a door lock device 42 engaged with a striker (not shown in the drawings) of the vehicle body is secured to the lock reinforcement portion 36. Because of this, the side door 10 can be locked in a state in which the side door 10 is closed. Furthermore, the front end portion of the aforementioned beltline inner reinforcement 26 is joined to the hinge reinforcement portion 34, the rear end portion of the beltline inner reinforcement 26 is joined to the lock reinforcement portion 36, and the lower end portions of the outer frame reinforcement 30 are reinforced by the beltline inner reinforcement 26.

Moreover, the front side joint portion 38F is placed on the door upper side of the rear side joint portion 38R. In other words, the upper end of the hinge reinforcement portion 34 is set in such a way as to be placed on the upper side of the upper end of the lock reinforcement portion 36. Additionally, the length to which the extension portion 34B of the hinge reinforcement portion 34 extends is set to substantially ⅕ of the lengthwise direction length of the frame portion 32B of the frame-side sash portion 32. That is, the front end portion of the frame portion 32B is formed by the extension portion 34B of the hinge reinforcement portion 34, and the front side lower end portion of the sash of the side door 10 is reinforced by the extension portion 34B whose plate thickness is thick.

It should be noted that a sash outer panel (not shown in the drawings) is disposed on the door outer side of the outer frame reinforcement 30. Additionally, the sash outer panel is formed along the inner panel-side sash portion 24 and is joined to the inner panel-side sash portion 24 in such a way as to cover the outer frame reinforcement 30 from the door outer side.

Next, the action and effects of the present embodiment will be described.

In the side door 10 to which the vehicle door frame structure S configured as described above has been applied, the door inner panel 20 has the door body portion 22 and the inner panel-side sash portion 24, and the door body portion 22 and the inner panel-side sash portion 24 are integrally molded by stamping, for example. Furthermore, the outer frame reinforcement 30 is disposed on the door outer side of the inner panel-side sash portion 24, and the outer frame reinforcement 30 is joined to the door inner panel 20. Because of this, the inner panel-side sash portion 24 of the door inner panel 20 is reinforced by the outer frame reinforcement 30.

Moreover, the outer frame reinforcement 30 is includes the frame-side sash portion 32 that is formed along the inner panel-side sash portion 24, the hinge reinforcement portion 34 that forms the front side lower end portion of the outer frame reinforcement 30, and the lock reinforcement portion 36 that forms the rear side lower end portion of the outer frame reinforcement 30. Additionally, the hinge 40 is attached to the hinge reinforcement portion 34, and the door lock device 42 is secured to the lock reinforcement portion 36. Because of this, reinforcement portions (the hinge reinforcement portion 34 and the lock reinforcement portion 36) can be disposed in the outer frame reinforcement 30, and these reinforcement portions can be effectively utilized to attach the hinge 40 and the door lock device 42.

Here, the upper end of the hinge reinforcement portion 34 is joined to the front side lower end of the frame-side sash portion 32, and the upper end of the lock reinforcement portion 36 is joined to the rear side lower end of the frame-side sash portion 32. Furthermore, the thicknesses of the hinge reinforcement portion 34 and the lock reinforcement portion 36 are set thicker than the thickness of the frame-side sash portion 32. Because of this, even in the case of setting thick the plate thicknesses of the reinforcement portions (the hinge reinforcement portion 34 and the lock reinforcement portion 36) in order to raise the strength of the reinforcement portions (the hinge reinforcement portion 34 and the lock reinforcement portion 36), the outer frame reinforcement 30 can be formed by setting thick just the plate thicknesses of the reinforcement portions and joining to the frame-side sash portion 32 the reinforcement portions that have been set thick. Because of this, it becomes unnecessary to increase the plate thickness of the entire outer frame reinforcement 30, so the reinforcement portions can be disposed in the outer frame reinforcement 30 while controlling an increase in the weight of the side door 10.

Furthermore, the front side joint portion 38F that is the joint portion between the frame-side sash portion 32 and the hinge reinforcement portion 34 is placed on the door upper side of the rear side joint portion 38R that is the joint portion between the frame-side sash portion 32 and the lock reinforcement portion 36. For this reason, the rigidity of the outer frame reinforcement 30 can be efficiently raised while controlling an increase in the weight of the outer frame reinforcement 30.

Figure 5:
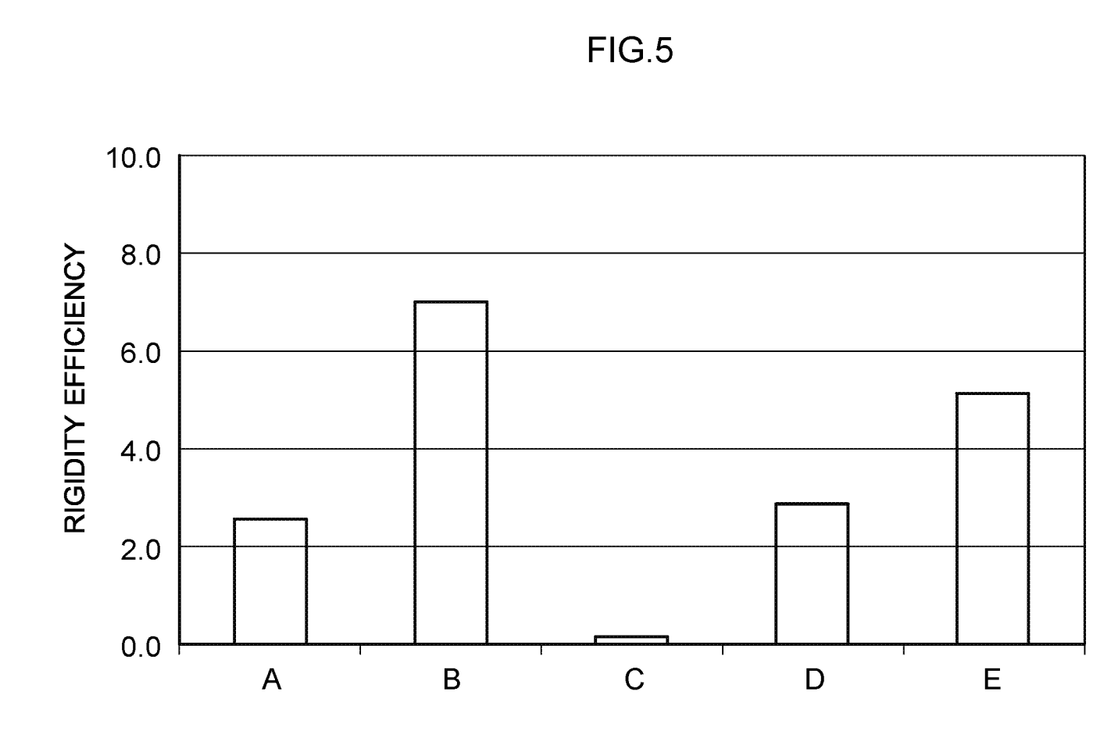
FIG. 5 is a graph for describing the rigidity efficiency of the side door when the plate thickness at various areas of the outer frame reinforcement shown in FIG. 1 is changed.

This point will be described below using the graph shown in FIG. 5. The graph shown in FIG. 5 is simulation results showing the rigidity efficiency of the side door 10 when the plate thickness of various areas of the outer frame reinforcement 30 is changed. Specifically, a force outward in the vehicle width direction acts on the side door 10 because of negative pressure that arises when the vehicle is traveling, so the graph of FIG. 5 comparatively shows the rigidity efficiency of the side door 10 with respect to various areas of the outer frame reinforcement 30 when a predetermined load outward in the vehicle width direction is applied to the upper end portion of the side door 10. Additionally, in these simulations, the amount of displacement of the side door 10 when the predetermined load outward in the vehicle width direction is applied to the upper end portion of the side door 10 is simulated and the rate of increase (%) in the rigidity of the side door 10 with respect to an initial state is calculated. Furthermore, the rate of increase (%) in the weight of the side door 10 at this time with respect to the initial state is calculated. Additionally, the rigidity efficiency of the side door 10 is defined as the value obtained by dividing the rate of increase (%) in the rigidity of the side door 10 by the rate of increase (%) in the weight of the side door 10, and the rigidity efficiency is the vertical axis of the graph shown in FIG. 5. For this reason, the higher the rigidity efficiency is, the higher the rigidity of the outer frame reinforcement 30 (the side door 10) can be made while controlling an increase in the weight of the outer frame reinforcement 30 (the side door 10).

Furthermore, A to E on the horizontal axis of the graph shown in FIG. 5 represent example simulations when the plate thickness of various areas of the outer frame reinforcement 30 is changed. Each simulation is described below.

Simulation A is a simulation in which a patch made of metal is joined to the body portion 34A of the hinge reinforcement portion 34 of the outer frame reinforcement 30.

Simulation B is a simulation in which the plate thickness of the extension portion 34B of the hinge reinforcement portion 34 of the outer frame reinforcement 30 is changed from 1.4 mm to 2.5 mm.

Simulation C is a simulation in which the plate thickness of the frame portion 32B of the outer frame reinforcement 30 is changed from 1.4 mm to 2.5 mm.

Simulation D is a simulation in which the plate thickness of the vertical pillar portion 32A of the outer frame reinforcement 30 is changed from 1.4 mm to 2.5 mm.

Simulation E is a simulation in which the plate thickness of the lock reinforcement portion 36 of the outer frame reinforcement 30 is changed from 2 mm to 2.5 mm.

It should be noted that the "initial state" in simulations A to E is a state in which the extension portion 34B of the hinge reinforcement portion 34 of the present embodiment is omitted, and in this state the front side joint portion 38F is set in the position indicated by the long dashed double-short dashed line A in FIG. 1.

Additionally, as shown in FIG. 5, it was understood that the example simulation in which the rigidity efficiency of the side door 10 is highest is example simulation B, in which the plate thickness of the extension portion 34B of the hinge reinforcement portion 34 of the outer frame reinforcement 30 is changed from 1.4 mm to 2.5 mm. That is to say, the rigidity of the side door 10 can be efficiently raised by disposing in the hinge reinforcement portion 34 the extension portion 34B forms the front end portion of the frame portion 32B and joining the extension portion 34B to the frame portion 32B. In other words, the rigidity of the side door 10 can be efficiently raised by changing the position of the front side joint portion 38F from the position indicated by the long dashed double-short dashed line A in FIG. 1 to the position of the front side joint portion 38F indicated by the solid line.

By contrast, as shown in simulation D in FIG. 5, in the case where the plate thickness of the vertical pillar portion 32A is increased, the rigidity efficiency becomes lower compared to simulation B. That is, the rigidity efficiency of the side door 10 can be raised more by changing the position of the front side joint portion 38F to the door upper side than by changing the position of the rear side joint portion 38R to the door upper side. Because of this, by placing the front side joint portion 38F on the door upper side of the rear side joint portion 38R, the rigidity of the outer frame reinforcement 30 can be efficiently raised while controlling an increase in the weight of the outer frame reinforcement 30.

Furthermore, the door inner side surface of the outer frame reinforcement 30 is evenly formed. That is to say, the door inner side surface (i.e., the surface on the door inner panel 20 side) of the outer frame reinforcement 30 is evenly formed in both the front side joint portion 38F and the rear side joint portion 38R. For this reason, the evenly formed door inner side surface of in the outer frame reinforcement 30 can be joined to the door inner panel 20 (the inner panel-side sash portion 24). Because of this, the outer frame reinforcement 30 and the door inner panel 20 (the inner panel-side sash portion 24) can be well joined to each other.

Furthermore, the angle of inclination θ of the door outer side surface of the front side joint portion 38F (the rear side joint portion 38R) with respect to the door outer side surface of the frame portion 32B is set larger than 0° and smaller than 30°. For this reason, a sudden change in plate thickness at the front side joint portion 38F (the rear side joint portion 38R) from the frame portion 32B to the hinge reinforcement portion 34 (the lock reinforcement portion 36) can be prevented and the bonding efficiency of the front side joint portion 38F (the rear side joint portion 38R) can be improved.

This point will be described using FIG. 4. That is to say, when L represents the joint length of the front side joint portion 38F, t1 represents the plate thickness of the hinge reinforcement portion 34, and t2 represents the plate thickness of the frame portion 32B, $L=(t1-t2)/\tan\theta$. For this reason, reducing tan θ results in the joint length L of the front side joint portion 38F being set longer, and a sudden change in plate thickness at the front side joint portion 38F (the rear side joint portion 38R) can be prevented. Additionally, in the tangent curve, there is an inflection point at 30° and the tan value suddenly increases at 30° or more. For this reason, by setting the angle of inclination θ of the door outer side surface at the front side joint portion 38F (the rear side joint portion 38R) with respect to the door outer side surface of the frame portion 32B larger than 0° and smaller than 30°, a sudden change in plate thickness at the front side joint portion 38F (the rear side joint portion 38R) is prevented and the bonding efficiency of the front side joint portion 38F (the rear side joint portion 38R) can be improved.

It should be noted that although in the present embodiment the frame portion 32B and the hinge reinforcement portion 34 (the lock reinforcement portion 36) are joined to each other at the front side joint portion 38F (the rear side joint portion 38R) by friction stir welding, the method by which these are joined to each other at the front side joint portion 38F (the rear side joint portion 38R) is not limited to this. For example, the frame portion 32B and the hinge reinforcement portion 34 (the lock reinforcement portion 36) may also be joined to each other by arc welding, laser welding, MIG welding, or TIG welding.

What is claimed is:

1. A vehicle door frame structure of a vehicle door, the vehicle door frame structure comprising:
    a door inner panel that forms a door inner side section of a vehicle door, the door inner panel having a door body portion and an inner panel-side sash portion, the inner panel-side sash portion being integrally formed on the door upper side of the door body portion and forms a window frame; and
    a frame reinforcement that is disposed on a door outer side of the inner panel-side sash portion, the frame reinforcement being joined to the door inner panel,
    wherein
    the frame reinforcement includes:
    a frame-side sash portion that includes a front side lower end and a rear side lower end, and the frame-side sash portion is formed along the inner panel-side sash portion from the front side lower end to the rear side lower end,
    a hinge reinforcement portion whose upper end is joined to the front side lower end of the frame-side sash portion, a hinge being attached to the hinge reinforcement portion,
    a lock reinforcement portion whose upper end is joined to the rear side lower end of the frame-side sash portion, a door lock device being attached to the lock reinforcement portion,
    a joint portion between the frame-side sash portion and the hinge reinforcement portion, and
    a thicknesses of the hinge reinforcement portion and the lock reinforcement portion are set thicker than a thickness of the frame-side sash portion, and
    wherein an angle of inclination of a door outer side surface of the joint portion between the frame-side sash portion and the hinge reinforcement portion with respect to a door outer side surface of a portion of the frame-side sash portion adjacent the front side lower end of the frame-side sash portion is set larger than 0° and smaller than 30°,
    wherein the door outer side surface of the joint portion between the frame-side sash portion and the hinge reinforcement portion faces an exterior of the vehicle door and the door outer side surface of the portion of the frame-side sash portion adjacent the front side lower end of the frame-side sash portion faces the exterior of the vehicle door.

2. The vehicle door frame structure according to claim 1, wherein the joint portion between the frame-side sash portion and the hinge reinforcement portion is placed on the door upper side of a joint portion between the frame-side sash portion and the lock reinforcement portion.

3. The vehicle door frame structure according to claim 1, wherein a door inner side surface of the frame-side sash portion and a door inner side surface of the hinge reinforcement portion at a joint portion between the frame-side sash portion and the hinge reinforcement portion are formed planar, and
    wherein the door inner side surface of the frame-side sash portion and a door inner side surface of the lock reinforcement portion at a joint portion between the frame-side sash portion and the lock reinforcement portion are formed planar.

4. The vehicle door frame structure according to claim 2, wherein a door inner side surface of the frame-side sash portion and a door inner side surface of the hinge reinforcement portion at the joint portion between the frame-side sash portion and the hinge reinforcement portion are formed planar, and wherein the door inner side surface of the frame-side sash portion and a door inner side surface of the lock reinforcement portion at the joint portion between the frame-side sash portion and the lock reinforcement portion are formed planar.

* * * * *

UNITED STATES PATENT AND TRADEMARK OFFICE
CERTIFICATE OF CORRECTION

PATENT NO. : 9,902,240 B2
APPLICATION NO. : 15/016777
DATED : February 27, 2018
INVENTOR(S) : Hirokazu Kawabe et al.

Page 1 of 1

It is certified that error appears in the above-identified patent and that said Letters Patent is hereby corrected as shown below:

In the Specification

In Column 4, Line 32, after "panel-side", delete "side".

In Column 6, Line 27, delete "38W" and insert --38R--, therefor.

Signed and Sealed this
Seventeenth Day of April, 2018

Andrei Iancu
*Director of the United States Patent and Trademark Office*